J. L. ERWIN.
COTTON CHOPPER AND CULTIVATOR.
APPLICATION FILED MAY 5, 1917.
1,266,005.
Patented May 14, 1918.
3 SHEETS—SHEET 2.
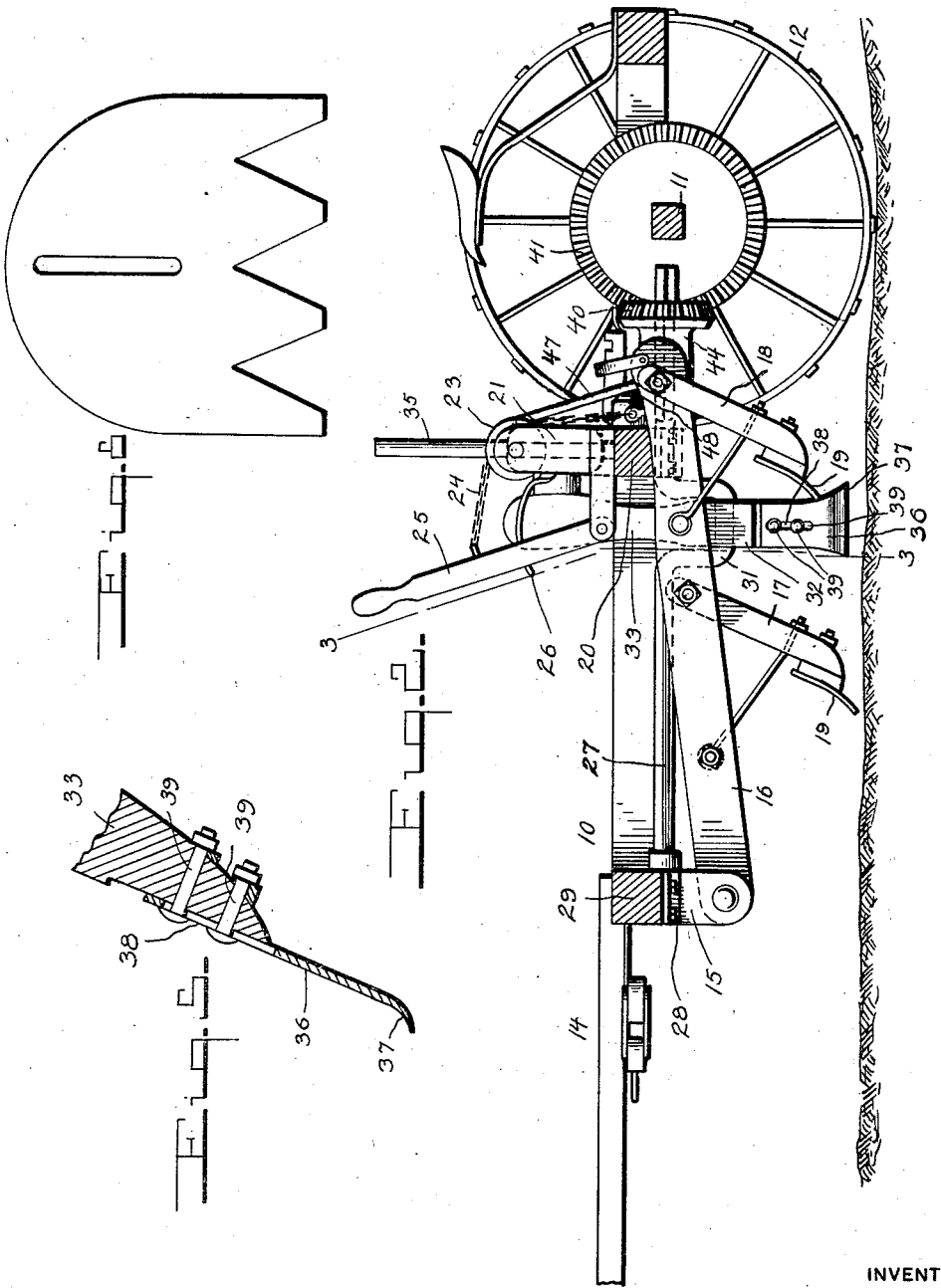
INVENTOR
James L. Erwin
WITNESSES
BY
ATTORNEY

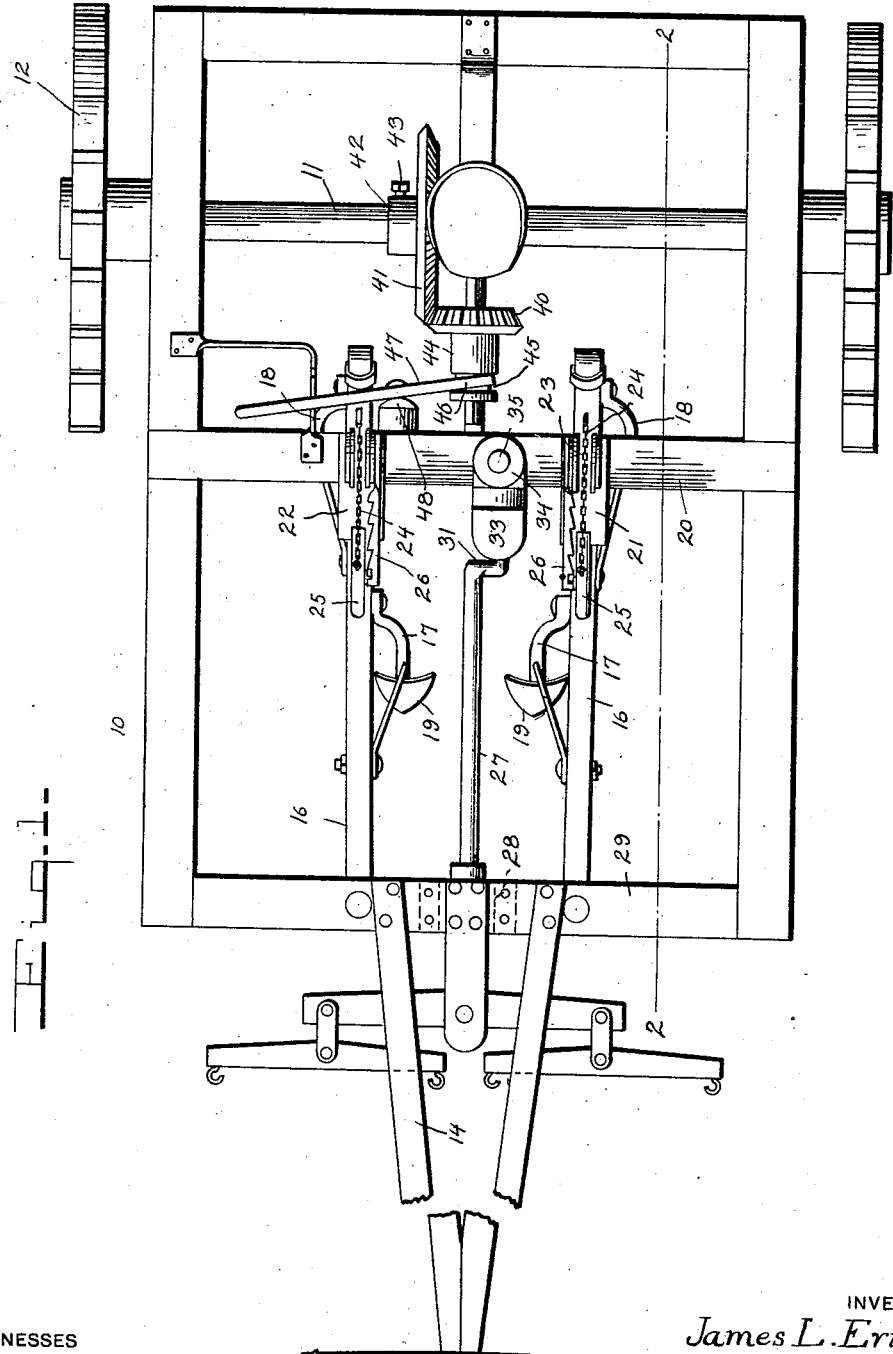

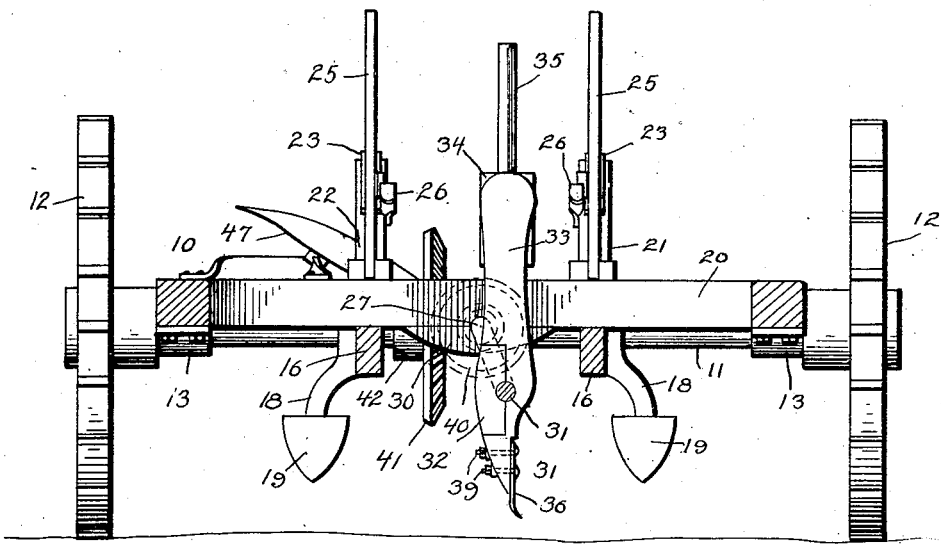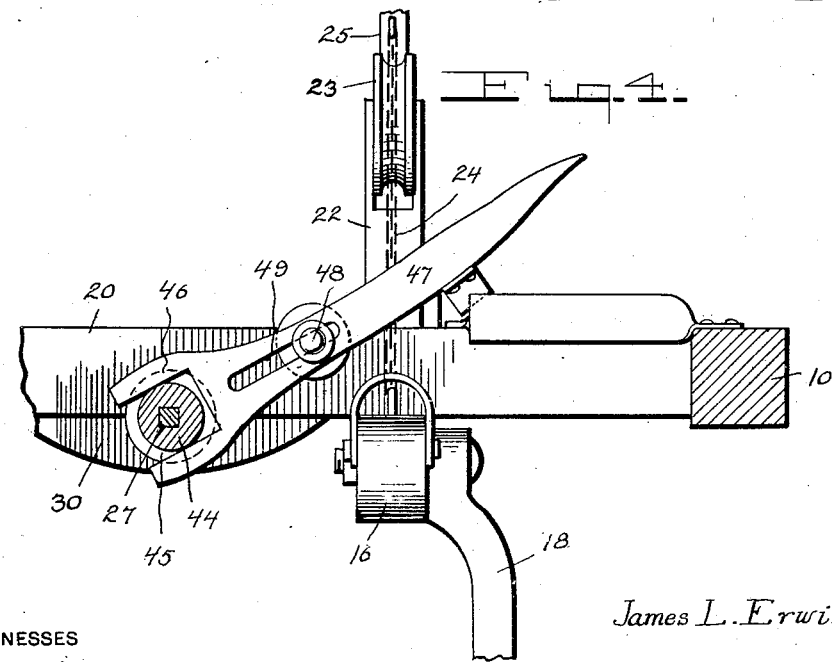

UNITED STATES PATENT OFFICE.

JAMES L. ERWIN, OF GREENSBORO, NORTH CAROLINA, ASSIGNOR OF ONE-HALF TO PAUL W. MACK, OF GREENSBORO, NORTH CAROLINA.

COTTON CHOPPER AND CULTIVATOR.

1,266,005.  Specification of Letters Patent.  Patented May 14, 1918.

Application filed May 5, 1917. Serial No. 166,660.

*To all whom it may concern:*

Be it known that I, JAMES L. ERWIN, a citizen of the United States, residing at Greensboro, in the county of Guilford and State of North Carolina, have invented certain new and useful Improvements in Cotton Choppers and Cultivators, of which the following is a specification.

This invention relates to an improvement in agricultural implements, and particularly to an implement for the cultivation of cotton, and has for its principal object to provide a machine which may be used solely as a cultivator for general farm use, and which may have applied thereto special devices for cutting all surplus plants from the row, being particularly valuable in this respect in the cultivation of cotton.

Another object of the invention is to provide a cultivator with a cotton chopping apparatus adapted to be readily attached thereto when desired and removable when the services of the machine are to be used solely for cultivating purposes, and further to design the machine so that cutting blades of various widths may be used for special and particular purposes and also to enable ready and easy change of the driving mechanism when it is desired to vary the speed of operation of the cutting blades.

A further object of the invention is to provide a simple means for attachment to a cultivator to convert the same into a combined chopper and cultivating implement and to make such changes and variations in the driving mechanism as are necessary to suit the conditions under which the machine is operated without needlessly disassembling the various parts of the machine.

With the above as the principal objects in view, the invention consists in the novel construction, combination, and arrangement of parts hereinafter described, pointed out in the appended claims and illustrated in the accompanying drawings, in which—

Figure 1 is a top plan view of the improved cotton cultivating and chopping machine, Fig. 2 is a vertical longitudinal sectional view of the same on the line 2—2 of Fig. 1, Fig. 3 is a vertical transverse sectional view on the line 3—3 of Fig. 2, Fig. 4 is a rear elevation partly in section of the shifting mechanism for changing the drive gear, Fig. 5 is a sectional view of the lower end of the cotton chopping blade, Fig. 6 is an elevation of a modified form of the blade to be used for special purposes.

Referring to the drawings, 10 indicates the main frame of a cultivator which may be of any size, form and material desired or found most convenient and which is supported near its rear end on a horizontal axle 11, preferably square in form but having circular ends on which are fixed the ground wheels 12, said circular portions being mounted to turn in boxes 13 secured upon the under side of the frame 10. At the forward end of the frame 10 is bolted a tongue 14 to which draft animals for drawing the cultivator are hitched.

Pivoted to bearings 15 depending from the under side of the frame 10 at the front thereof are two cultivator beams 16 which extend rearwardly toward the axle 11 and each has secured thereto two standards 17 and 18 on opposite sides of the beams 16 and at different points in the lengths of said beams. Each of these standards carries a shovel 19 on its lower end for the purpose of loosening the ground and hilling it on the two sides of the row of plants under cultivation.

Secured on the cross bar 20 midway the length of the frame 10 are two brackets 21 and 22 to each of which is pivoted a grooved pulley 23 over which passes a chain 24, each chain connected at one end to the rear end of a beam 16, the opposite ends of said chains being secured each to a lever 25 pivoted at its lower end on a bracket and having a locking dog to engage a toothed plate 26 for the purpose of retaining the lever in any position of adjustment, and consequently the cultivator beams 16 at such position of elevation or depression as is required for working the ground.

Extending longitudinally of the cultivator frame 10 in the central line thereof is a horizontal shaft 27, the forward end of which is mounted in a bearing 28 removably bolted to the under side of the forward bar 29 of frame 10. A second bearing 30 is bolted on the under side of the cross bar 20 and affords a bearing for the rear end of shaft 27. In front of the cross bar 20 the shaft 27 is provided with a crank 31 that is journaled in a boxing 32 on the lower end of a chopping arm 33, the upper end of said arm being pivotally connected on one side of a sleeve 34 mounted to slide freely on a vertical rod 35 that projects upwardly from the cross bar 20. Below the boxing 32, the arm 33 carries a cutting blade 36 that engages certain of the plants in the row of cotton plants and cuts them down or removes them from the row when the plants are too thick for their proper growth. The blade 36 has a broad cutting edge 37 at its lower end and a longitudinal slot 38 at the upper end through which fastening bolts 39 are passed for securing the blade on the lower end of the arm 33. By this means of fastening it may be readily seen that the position of the blade relative to the arm 33 may be adjusted to suit conditions.

In place of the blade 36 which may have a straight cutting edge, a blade similar to that shown in Fig. 6 may be substituted therefor, said latter blade having a plurality of saw tooth projections on its lower edge.

The shaft 27 in rear of the bearing 30 is preferably square as shown, and extends nearly to the axle 11. On this square portion of the shaft is slidably mounted a bevel pinion 40 which may be moved on said shaft into mesh with a bevel gear 41 secured to the axle 11 by a hub or collar 42 on the gear and a binding screw 43 in said collar screwed into engagement with the axle 11. The bevel pinion 40 has a hub 44 in which is formed a circular groove 45 for the bifurcated end 46 of a shifting lever 47 pivotally mounted on the cross bar 20 at 48 by means of a bolt passing through a longitudinal slot 49 in the lever 47, this slot permitting the lever to be moved endwise sufficiently far to wholly disconnect the bifurcated end 46 from the hub 44 and thus enable the shaft 27, bevel gear 40, and chopping lever 33 being removed from the cultivator with little trouble.

In using the machine above described, the four cultivator shovels shown may be used if desired, but preferably for chopping and cutting cotton the two forward shovels 19 only are required. The machine is drawn through the field with the row of plants passing between the cultivators 16 in line with the chopping blade 36 and arm 33. The ground wheels 12 fixed to the shaft 11 rotate the latter and through the bevel gear 41 and pinion 40 the crank shaft 27 is rotated. The speed of this shaft is adjusted by the size of the bevel pinion 40 which may be larger or smaller as desired and made to mesh readily with the bevel gear 41 by adjusting the latter on the axle 11. When it is desired to rotate the shaft 27 after the proper gears have been placed in position, the hand lever 47 is moved to force the bevel pinion 40 into engagement with the gear 41 and thus set up rotation of the shaft 27 which through the crank 31 and its connection 32 with the arm 33 will cause the blade 36 to move in a rotary path in a vertical plane transversely to the line of direction in which the machine is traveling. This will, as it moves downwardly and horizontally through the ground, cut or otherwise remove certain plants from the row of plants over which the machine is traveling, and rising upwardly will pass over certain other plants to again engage superfluous plants in the row and so on until the end of the row has been reached. At the same time the shovels 19 are digging the earth and hilling the same about the plants in the row.

If the machine is to be used as a cultivator alone, the shaft 27 may be removed by unbolting the bearings 28 and 30. The shaft 27 can then be separated and the sleeve 34 lifted from the rod 35.

What I claim is:

1. A cotton chopper and cultivator comprising a frame, wheels fixed on an axle supporting said frame, a pair of cultivating implements suspended below the frame, a horizontal crank shaft extending longitudinally in the central line of the frame and mounted in bearings thereon, driving gear between the axle and the crank shaft, a sleeve slidable vertically on a support carried by the frame, an arm pivotally connected at one end to said sleeve and at its opposite end to the crank of the crank shaft and adapted to be moved by said crank shaft in a path transversely of the row of plants under treatment, and a chopping blade adjustably mounted on the lower end of said arm for engaging and removing certain plants from the row.

2. A cotton chopper and cultivator comprising a frame, wheels fixed on an axle supporting said frame, a pair of cultivating implements suspended below the frame, a horizontal crank shaft extending longitudinally in the central line of the frame and mounted in bearings thereon, driving gear between the axle and the crank shaft, a vertical post mounted on the frame, a sleeve slidable longitudinally on said post and having a lateral projection, a depending arm pivoted on said projection at its upper end, a bearing box at the lower ends of said arm to receive said crank, and a flat broad faced chopping blade adjustably secured on the lower end of said arm.

In testimony whereof I affix my signature in presence of two witnesses.

JAMES L. ERWIN.

Witnesses:
J. H. JOHNSON,
PAUL W. MACK.

Copies of this patent may be obtained for five cents each, by addressing the "Commissioner of Patents, Washington, D. C."